April 24, 1956     O. H. SCHMITT ET AL     2,743,024
TRANSLATION SYSTEM
Filed July 31, 1944
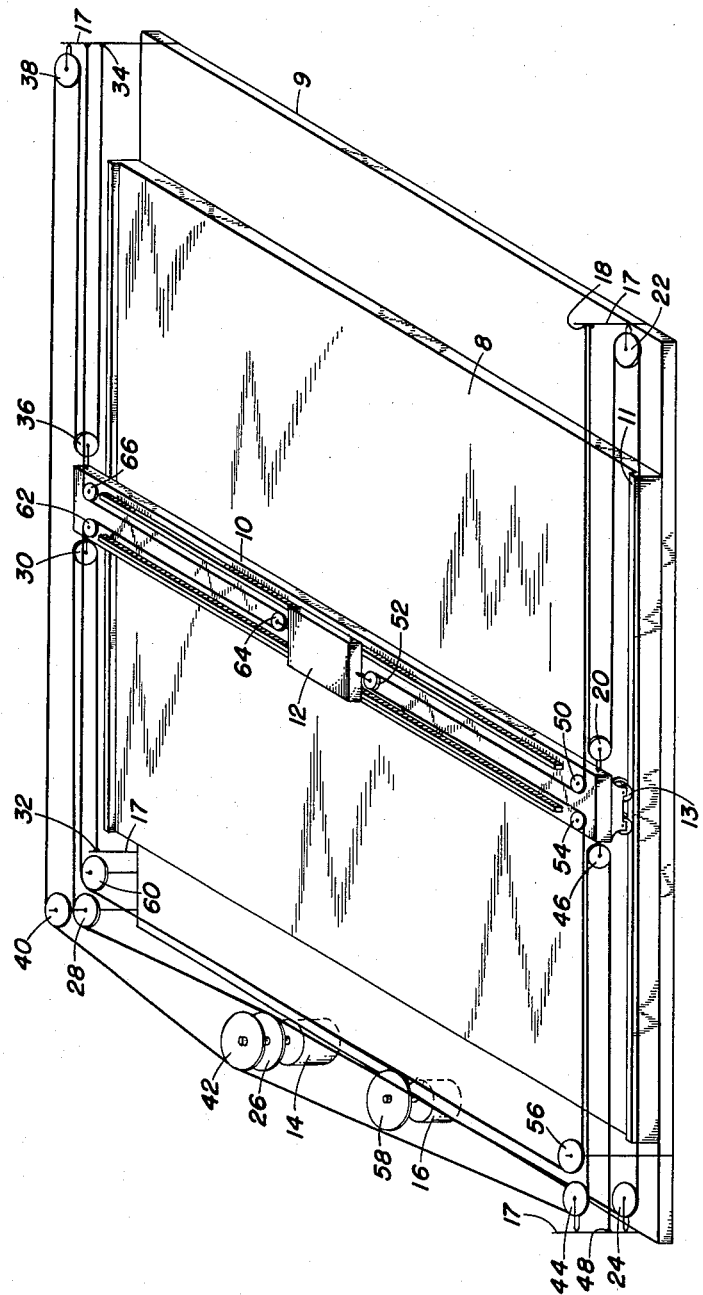
INVENTORS
OTTO H. SCHMITT
EARL G. SORENSEN
BY
ATTORNEYS United States Patent Office 2,743,024
Patented Apr. 24, 1956

2,743,024

TRANSLATION SYSTEM

Otto H. Schmitt, Port Washington, and Earl G. Sorensen, Garden City, N. Y., assignors to the United States of America as represented by the Secretary of the Navy Application July 31, 1944, Serial No. 547,478

6 Claims. (Cl. 212—24)

This invention relates to improvements in translation systems adapted for producing plane motion of a body over an area and including a beam movable over the area and a carriage movable along the beam.

Translation systems of the type herein contemplated may be referred to as beam-suspension systems and are used extensively in the well-known bridge crane and in similar devices. In such applications it is usual to provide separate electric motor drive means for the beam and carriage and to mount the motors directly on the moving member with which they are associated. The drive of the moving members is effected, in each case, by means of rack and pinion systems which serve to transmit power from the motors and also, in the case of the beam, to prevent yawing thereof as it moves over the area.

Drive arrangements of the type referred to above have several limitations which preclude their use when the translation system is made a part of a small-scale device or when the system is used in conjunction with certain types of measuring instruments. The physical size of suitable drive motors may be such that they cannot conveniently be mounted on or supported by the moving members, and systems for transmitting electric power to them from a stationary source are necessarily rather complex. In addition, it may be undesirable to subject measuring instruments mounted on the translation system to the magnetic fields associated with the drive motors.

Some uses for which devices of this type are particularly adapted, are for reproducing geographical or strategic systems, as for example, in an attack trainer, or for setting up remotely indicating meter charts for tracing operation curves of various types, etc.

It is proposed according to the present invention, therefore, to provide a translation system in which movements of the beam and carriage are effected by means of remotely located drive motors connected to the moving members by simple mechanical systems such that the beam may be prevented from yawing as it moves, and motion of either the beam or the carriage may be effected without interaction between the two motions.

In the accompanying drawing, there is shown a typical beam-suspension translation system arranged to move a body over a surface shown schematically as table top 8 which is affixed to an anchoring member 9. The system includes a movable member or beam 10, mounted for motion by some interconnecting means such as rails 11 and flanged wheels 13 in one direction over the surface and a carriage 12, mounted for motion along beam 10. Drive means according to the invention are provided to effect movements of the beam and carriage as desired. Thus power for effecting such movements is furnished by a pair of remotely located drive motors 14 and 16 which are respectively connected mechanically to beam 10 and carriage 12.

The mechanical system, connecting the beam with its drive motor, comprises two similar systems of cables and pairs of diagonally opposed attaching devices, shown here as pulleys, which operate jointly to produce the required motion of the beam. In one cable system, one end of the drive cable in anchored by anchoring means 17 at 18, a fixed point beyond the limit of travel of the beam. The cable passes around beam pulley 20 mounted at the end and on one side of the beam, whence it runs around fixed pulley 22 adjacent point 18 and then around fixed pulley 24, located beyond the other limit of travel of the beam. From this pulley, the cable passes around drive pulley 26 mounted on the shaft of motor 14, and thence around fixed pulley 28 to beam pulley 30 mounted at the other end of the beam and at the opposite side from beam pulley 20. From pulley 30, the cable runs to point 32, at which it is anchored.

A second and similar cable system, in which the cable starts at point 34 and runs over beam pulley 36, fixed pulleys 38 and 40, drive pulley 42 mounted on the shaft of motor 14, fixed pulley 44 and beam pulley 46 to terminal point 48, completes the beam-cable system. Drive pulleys 26 and 42 are of equal radius and, as will be noted in the drawing, the two drive cables are wrapped about the respective drive pulleys in opposite directions. It will be understood, therefore, that as cable is taken in to move the end of beam supporting pulleys 20 and 46 in the direction of the arrow, an equal amount of cable is taken in at the other end of the beam on the same side thereof. Simultaneously, equal amounts of cable are paid off over pulleys 30 and 46 to permit motion of the beam.

It will be recognized, therefore, that the forces acting on the beam are at all times such that no twisting moments tending to disorient the beam can be produced as the beam moves over the area. The beam is thus prevented from yawing and binding in its ways as it is moved back and forth over the area.

Carriage 12 is moved along the beam by means of remotely located drive motor 16 acting through a third cable system. The single cable of this system extends from terminal point 18 over idler pulley 50 mounted on the end of the beam to carriage pulley 52, and over a second idler pulley 54 mounted adjacent idler pulley 50. From this pulley, the cable runs over pulley 56 mounted adjacent terminal point 48, around drive pulley 58 mounted on the shaft of carriage-drive motor 16, then over pulley 60, idler pulley 62, carriage pulley 64 mounted opposite carriage pulley 52, and idler pulley 66 to terminal point 34. As drive motor 16 turns drive pulley 58, cable is taken in at one end of carriage 12 and paid out at the other end thereof, causing movement of the carriage along the beam.

A consideration of the several cable systems will indicate that motion of beam 10 may be effected by drive motor 14 without causing any motion of carriage 12 along the beam. As the beam moves, the two branches of the carriage-drive cable run freely over pulleys 50, 52, and 54 and pulleys 62, 64 and 66 without exerting any unbalanced force on the carriage. Likewise, motion of carriage 12 may be effected by drive motor 16 without causing motion of the beam, since forces exerted on the beam by the carriage-drive system in the direction of travel of the beam are in all cases balanced.

What is claimed is:

1. A system for translating a movable member back and forth across a surface with a minimum of yaw comprising an anchoring member, said surface being affixed to said anchoring member, a plurality of pairs of attaching devices affixed to said movable member, each of said pairs of attaching devices consisting of individual attaching devices positioned on said movable member in diagonally opposed relationship to each other, a plurality of cables, each cable being associated with one pair of attaching devices and operatively linking said individual attaching devices of each pair of attaching devices, and means including motor means affixed to said anchoring member and operatively associated with each cable to give said movable member translational movement back and forth across said surface with a minimum of yaw.

2. A system for translating a movable member back and forth across a surface with a minimum of yaw comprising an anchoring member, said surface being affixed to said anchoring member, a plurality of pairs of attaching devices affixed to said movable member, each of said pairs of attaching devices consisting of individual attaching devices positioned in diagonally opposed relationship to each other on said movable member, a plurality of cables, each cable being associated with one pair of attaching devices and operatively joining said individual attaching devices of each pair of attaching devices, first pulleys affixed to said anchoring member and in contact with said cables for causing the end of portions of each cable to be substantially parallel to each other, and motor means mounted on said anchoring member and coupled to each of said cables for causing said movable member to move back and forth across said surface with a minimum of yaw.

3. A system as set forth in claim 2 including a carriage mounted on said movable member, and means coupled to said carriage for moving said carriage in a direction normal to the direction of motion of said movable member independently of the motion of said movable member.

4. A system as set forth in claim 3 including second pulleys affixed to opposite sides of said carriage, third pulleys affixed to said movable member, a second cable having the ends thereof affixed to said anchoring member and its intermediate portion extending around said second and third pulleys, and motor means affixed to said anchoring member and in contact with said second cable for imparting motion to said carriage in a direction normal to said movement of said movable member.

5. A system for translating a beam back and forth across a surface with a minimum of yaw comprising an anchoring member, said surface being affixed to said anchoring member, interconnecting means between said surface and said beam for guiding said beam across said surface with substantially rectilinear motion, a plurality of pairs of attaching devices affixed to said beam, each of said pairs of attaching devices consisting of one attaching device positioned in diagonally opposed relationship to another attaching device of said pair, a cable joining said individual attaching devices of each said pairs of attaching devices, pulleys affixed to said anchoring member and associated with each of said cables, each of said cables extending from one of said attaching devices around said pulleys associated therewith to its diagonally opposed attaching device whereby the end portions of each cable are substantially parallel to each other, and motor means coupled to each of said cables for causing said beam to traverse said surface in a rectilinear motion with minimum of yaw.

6. A system for translating a beam back and forth across a surface with a minimum of yaw comprising an anchoring member, said surface being affixed to said anchoring member, interconnecting means between said surface and said beam for guiding said beam across said surface with substantially rectilinear motion, first pulleys affixed to said beam substantially at the corners thereof, second pulleys affixed to said anchoring member, anchoring means positioned on said anchoring member proximate to each of said second pulleys, a plurality of cables, each cable having one end thereof fastened to one of said anchoring means then extending around one of said first pulleys at one corner of said beam, around a plurality of said second pulleys, thence around another of said first pulleys which is located in diagonally opposed relationship to said one of said first pulleys, the other end of said cable being fastened to another of said anchoring means whereby the portions of said cable in contact with each of said first pulleys are substantially parallel to each other, and motor means coupled to each of said cables for causing said cables to cause said beam to translate back and forth across said surface with a minimum of yaw.

References Cited in the file of this patent

UNITED STATES PATENTS

| 482,648 | Olson | Sept. 13, 1892 |
| 2,413,300 | Dunn et al. | Dec. 31, 1946 |

FOREIGN PATENTS

| 19,204 of 1889 | Great Britain | Nov. 29, 1889 |
| 3,817 of 1890 | Great Britain | Mar. 11, 1890 |